United States Patent
Liu et al.

(10) Patent No.: US 6,780,062 B2
(45) Date of Patent: Aug. 24, 2004

(54) MULTI-SPECIFICATION READ/WRITE SIGNAL TRANSMISSION MODULE FOR SILICON DISKS

(75) Inventors: Wen-Tsung Liu, Hsin Tien (TW); Mi-Chang Chen, Hsin Tien (TW); Chia-Li Chen, Hsin Tien (TW)

(73) Assignee: Carry Computer Eng., Co., Ltd., Taipei (TW)

( * ) Notice: Subject to any disclaimer, the term of this patent is extended or adjusted under 35 U.S.C. 154(b) by 17 days.

(21) Appl. No.: 10/192,617

(22) Filed: Jul. 11, 2002

(65) Prior Publication Data

US 2003/0098346 A1 May 29, 2003

(30) Foreign Application Priority Data

Nov. 29, 2001 (CN) ........................................ 90220627 U (51) Int. Cl.[7] .............................................. H01R 24/00
(52) U.S. Cl. ...................................... 439/630; 439/946
(58) Field of Search ............................... 439/630, 76.1, 439/946, 638, 64; 361/654, 737

(56) References Cited

U.S. PATENT DOCUMENTS

| | | | | |
|---|---|---|---|---|
| 5,184,282 A | * | 2/1993 | Kaneda et al. .............. 361/737 |
| 5,666,497 A | * | 9/1997 | Milhaupt et al. ........... 710/305 |
| 5,679,007 A | * | 10/1997 | Potdevin et al. ........... 439/76.1 |
| 5,688,130 A | * | 11/1997 | Huang .......................... 439/79 |
| 5,775,923 A | * | 7/1998 | Tomioka ...................... 439/79 |
| 6,069,795 A | * | 5/2000 | Klatt et al. ................. 361/737 |
| 6,097,605 A | * | 8/2000 | Klatt et al. ................. 361/737 |
| 6,145,023 A | * | 11/2000 | Iwasaki ....................... 710/13 |
| 6,250,965 B1 | * | 6/2001 | Neifer ......................... 439/630 |
| 6,478,615 B1 | * | 11/2002 | Kuo ......................... 439/541.5 |

FOREIGN PATENT DOCUMENTS

| EP | 1 291 804 | * | 3/2003 |
|---|---|---|---|
| FR | 2 753 817 | * | 3/1998 |

* cited by examiner

*Primary Examiner*—Hae Moon Hyeon
(74) *Attorney, Agent, or Firm*—J.C. Patents (57) ABSTRACT

A multi-specification read/write signal transmission module for silicon disks, it is provided on the center of a "U" shaped base with a partitioning plate, an upper and a lower lid, so that the base is formed therein a first and a second receiving chamber. The first receiving chamber is provided therein at least with a vertically contacting pin set, and the second receiving chamber is provided therein at least with a horizontally contacting pin set, in order that when silicon disks with different specifications are individually inserted into the first or the second receiving chamber, they can contact respectively with the vertically contacting pin set or the horizontally contacting pin set. In this way, the module of the present invention can suit all the silicon disks.

13 Claims, 8 Drawing Sheets

MULTI-SPECIFICATION READ/WRITE SIGNAL TRANSMISSION MODULE FOR SILICON DISKS

CROSS-REFERENCE TO RELATED APPLICATION

This application claims the priority benefit of Taiwan application serial No. 090220627, filed Nov. 29, 2001.

BACKGROUND OF THE INVENTION

1. Field of the Invention

The present invention is related to a multi-specification read/write signal transmission module for silicon disks, and especially to a signal transmission module for silicon disks (flash memory cards/small memory cards) of various specifications in the markets, it is provided with a structure with a common space for reading and writing on silicon disks of various specifications to thereby satisfy the requirement of customers.

2. Description of the Prior Art

The silicon disks developed in the recent years are light, thin and small, they have the superior features of high storage capacity, vibration durability, repeated memorizing for many times etc., and are widely applied in the field of IA (Information Appliance) and many portable digital products. For example, merely all the popular products including personal digital assistants (PDA), digital cameras (DSC), digital walkmans (MP3 Players) etc. in the markets use the silicon disks as storage media.

By virtue that IA is a newly rising field, its products are novel and multivariable; thereby, the criteria of the silicon disks form a large market that makes struggles for development as well as competitions among international big manufacturers. There is no uniform standard or specification presently in the art of silicon disks in the whole world. Products that are mutually related include at least PC ATA cards, CF cards (CompactFlash cards), SM cards (Smart Media cards), MMC cards (MultiMedia cards), MS cards (Memory Stick cards) and SD cards (Secure Digital cards) etc.; and not only are multifactorial, but also have their respective predominance in the markets.

The multiple specifications of the silicon disks induce market strategies as to manufacturers. For example, if customers find that their neighboring people do not use MS cards or are uneasy to purchase MS cards, he may think about whether he will purchase and use a digital camera for MS cards. On the contrary, a customer who have purchased a digital camera for MS cards may not purchase a PDA of some other brand, rather, he may still want to purchase a PDA still of the kind using MS cards, unless he wants to use another kind of specification of silicon disk.

For the large group of customers, however, lacking of uniform standards and specifications for silicon disks is not a good thing. This is because that silicon disks are unable to achieve effective applicability on various portable digital products, computer systems and peripheral equipments of computers, and this makes inconvenience of use of consumers. The computers are quite restrained in selection of using digital products.

Therefore, it is an extremely important direction of consideration to make efforts to provide a module compatible with all known specifications for silicon disks and capable of integrating all the electronic transmission modes of these silicon disks, in order that the module can be built in or externally connected to computers and other digital products to thereby increase the convenience for consumers in using silicon disks of different specifications.

The Prior Art

Figure 1:
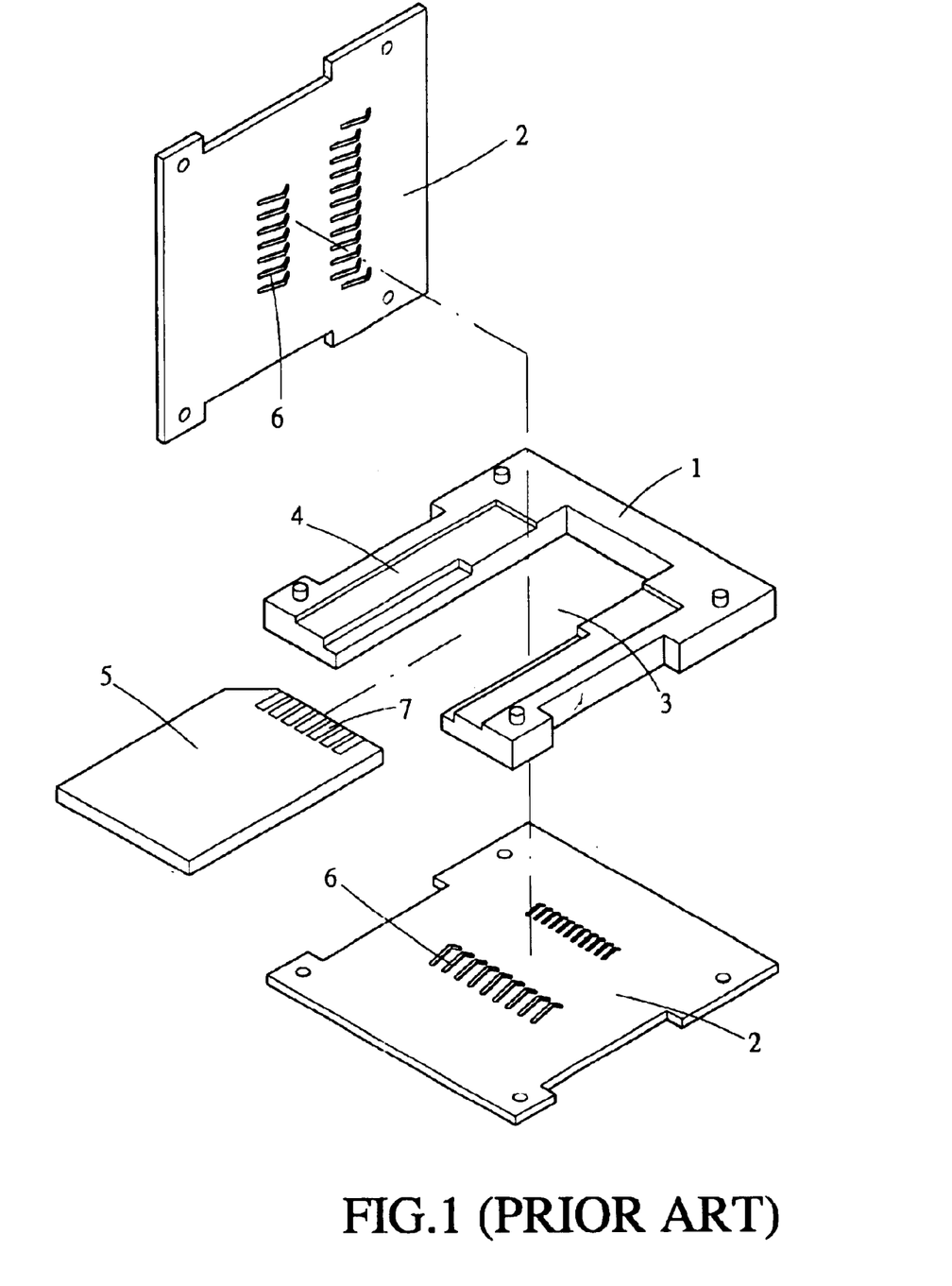
FIG. 1 is an analytical perspective view of a conventional structure of a signal transmission module.

During study and development of the present invention, the inventor had designed a primary structure for reading and writing on silicon disks for the purpose of achieving the above stated objects. The structure of the module in practicing is shown in FIG. 1: Wherein, a "U" shaped base 1 is provided on the upper and the lower sides thereof respectively with an electric circuit board 2, the "U" shaped base 1 is formed in the center thereof a receiving space 3. A plurality of guide recesses 4 are provided on the lateral arms at the two lateral sides of the receiving space 3. Each of the guide recesses 4 has the sizes of length and width thereof in coincidence with a kind of silicon disk 5; thereby, several kinds of silicon disks 5 can be inserted in the receiving space 3. And the upper and the lower electric circuit boards 2 are provided on the surfaces thereof confronting the receiving space 3 with a plurality of protruding contact pin sets 6, each pin set 6 is positioned in corresponding to that of the signal pin set 7 of a silicon disk 5. When the silicon disk 5 is inserted into the receiving space 3, the pin sets 6 of the upper and the lower electric circuit boards 2 can be connected with the signal pin set 7 of a silicon disk 5 for reading the data in the silicon disk 5.

Figure 5:
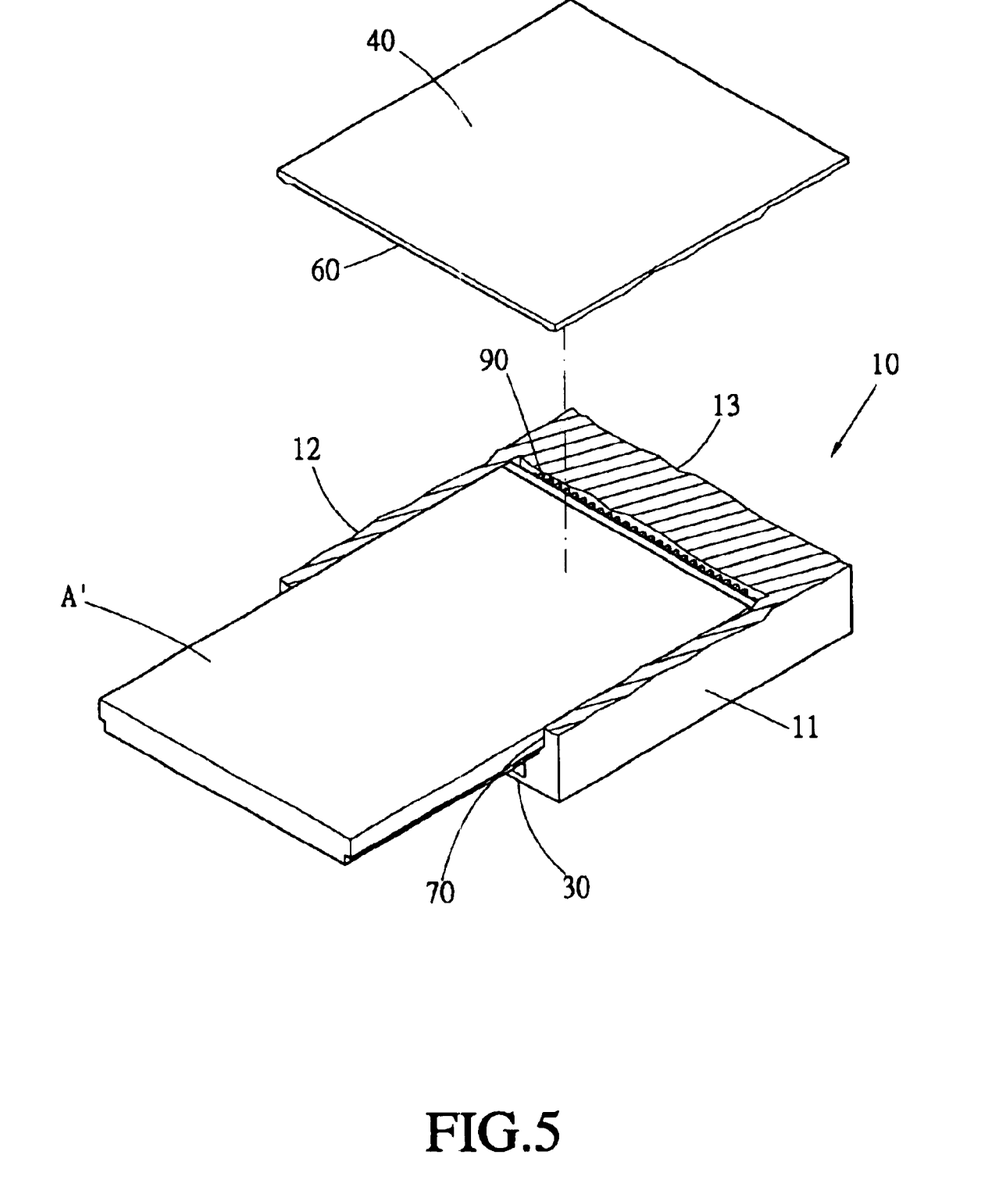
FIG. 5 is a perspective view showing that the second receiving chamber of the present invention receives a silicon disk.

The primary structure designed by the inventor of the present invention can surely achieve the object of reading on several kinds of silicon disks; however, it cannot suit all kinds of silicon disks. This is mainly because that the contact pin sets 6 provided on the upper and the lower electric circuit boards 2 and protruding into the receiving space 3 is vertically contact with the silicon disk 5; but the signal pin sets of some silicon disks 5 are provided on the front end face of the silicon disks 5 (such as PC ATA cards or CF cards as shown in FIG. 5 depicting a silicon disk A'), thereby, the contact pin sets 6 provided on the upper and the lower electric circuit boards 2 can not contact or connect with such a silicon disk 5, they do not suit all kinds of silicon disks.

SUMMARY OF THE INVENTION

To solve the above stated problems and to render a read/write signal transmission module for silicon disks to suit all kinds of silicon disks, the inventor of the present invention reconsider the above stated primary structure concentrating on designing of the different specifications, and developed the multi-specification read/write signal transmission module for silicon disks of the present invention after nonstop study and tests, with the module, all known silicon disks with different specifications can be inserted and read/written.

In particular, the present invention is provided on the center of a "U" shaped base with a partitioning plate, an upper and a lower lid, so that the base is formed therein a first and a second receiving chamber. The base is provided respectively on the lateral arms at the lateral sides of the first and the second receiving chambers with a plurality of guide recesses, thereby, different kinds of silicon disks with different specifications can be inserted therein. The first receiving chamber is provided therein at least with a vertically contacting pin set, and the second receiving chamber is provided therein at least with a horizontally contacting pin set, in order that when silicon disks with different specifications are individually inserted into the first or the second receiving chamber, they can contact respectively with the vertically contacting pin set or the horizontally contacting pin set. In this way, the module of the present invention can suit all the silicon disks with different specifications in the markets.

The primary object of the present invention is that, by the fact that the above stated vertically and the horizontally contacting pin sets are allocated at different orientations, when a silicon disk is inserted into the module, it can be connected with one of the vertically and the horizontally contacting pin sets to proceed to transmit signals for and read/write on the silicon disk. Thereby, the module of the present invention can meet module of the present invention can of multiple silicon disks.

Another object of the present invention is that, after the base is divided into the upper first and the lower second receiving chambers by means of the partitioning plate, the first and the second receiving chambers can respectively receive a silicon disk of its own specification. This makes customers convenient in use.

The present invention will be apparent in its structural characteristics after reading the detailed description of the preferred embodiment thereof in reference to the accompanying drawings.

DETAILED DESCRIPTION OF THE PREFERRED EMBODIMENT

Figure 2:
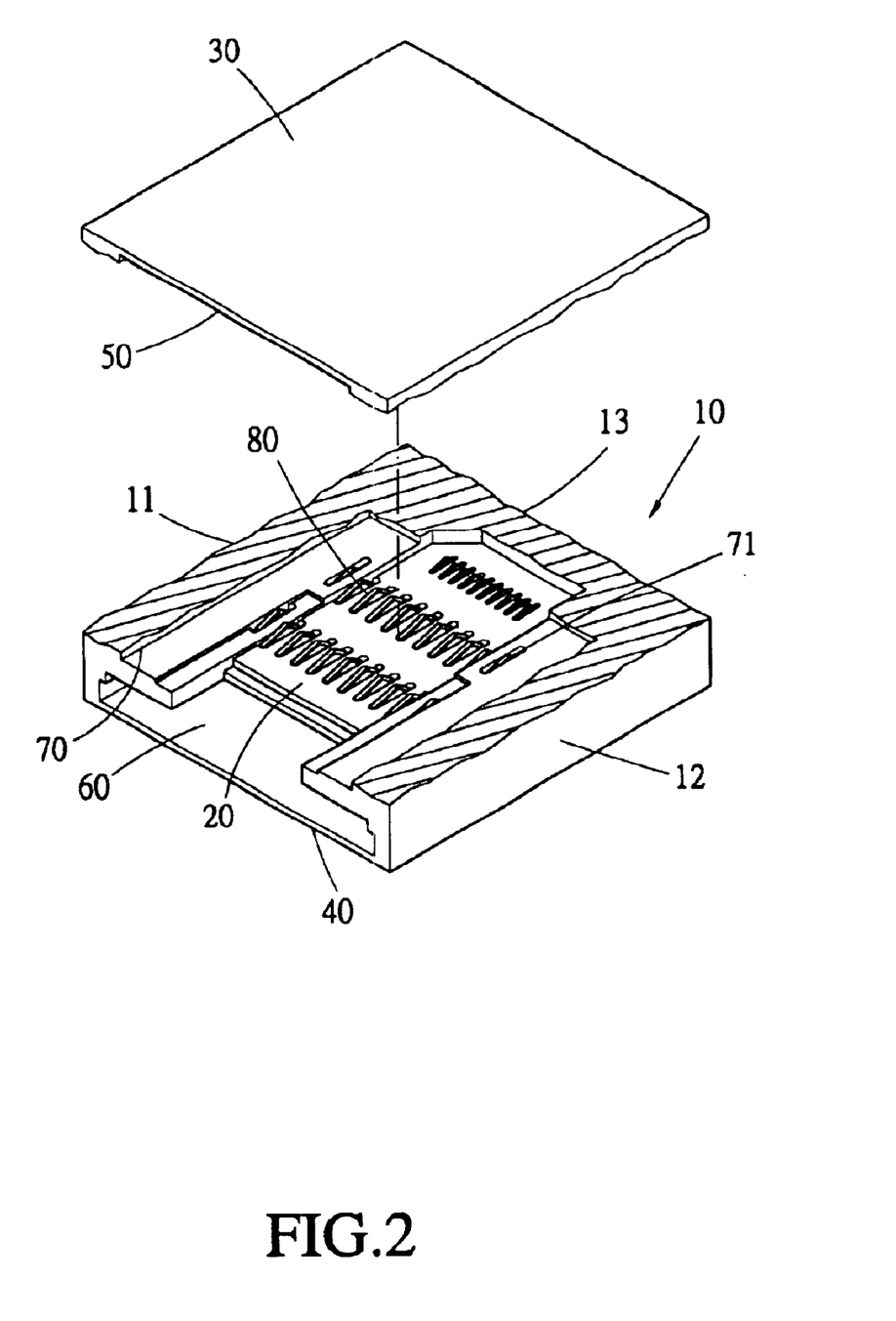
FIG. 2 is a perspective view of the present invention.
Figure 4:
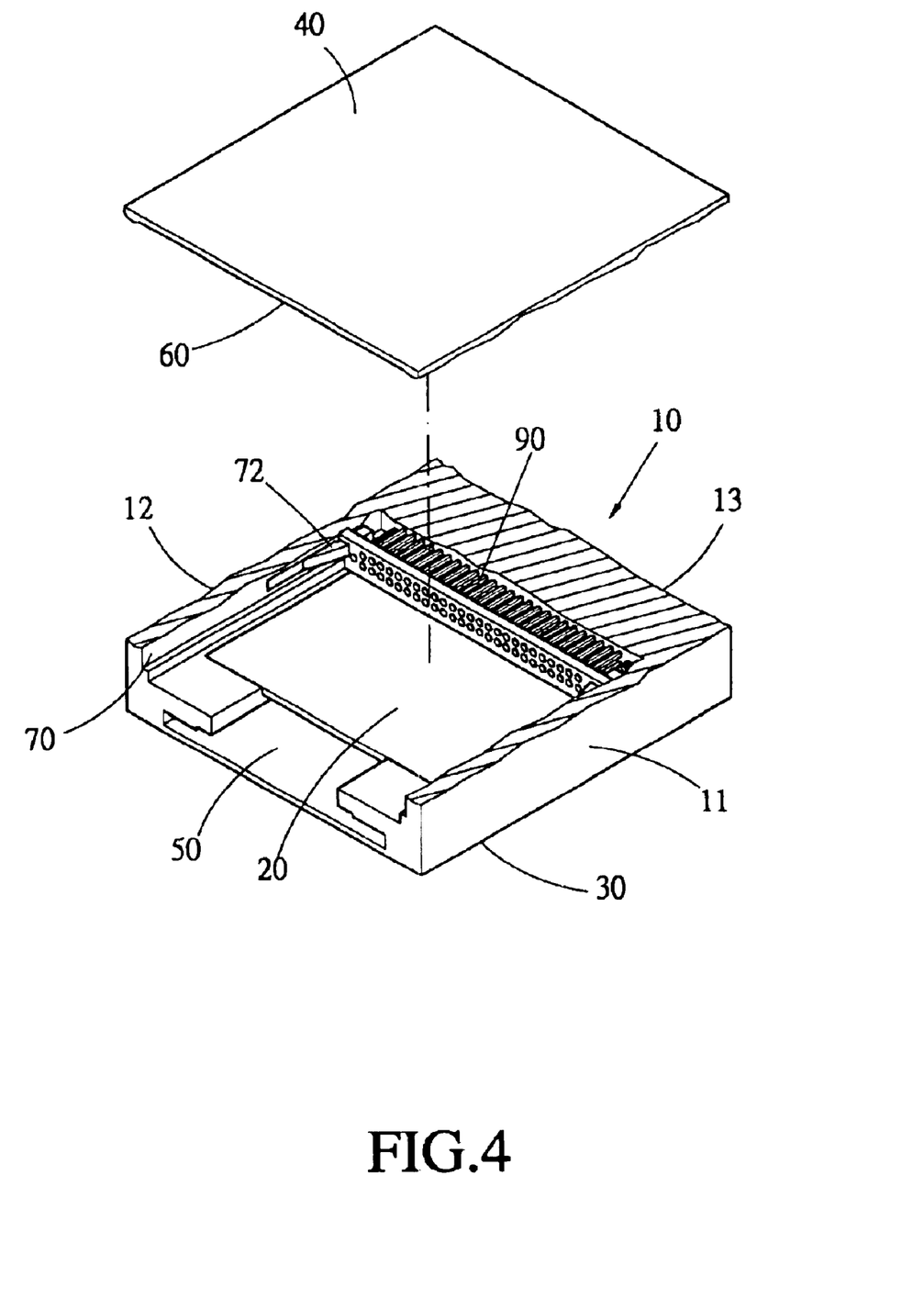
FIG. 4 is a perspective view of the present invention showing the up-side-down state of FIG. 2.

Referring firstly to FIGS. 2–5, the multi-specification read/write signal transmission module for silicon disks of the present invention is provided on the center of a "U" shaped base 10 with a partitioning plate 20, and is provided with an upper lid 30 and a lower lid 40; so that the base 10 is formed therein between the partitioning plate 20 and the upper lid 30 a first receiving chamber 50, and is formed therein between the partitioning plate 20 and the lower lid 40 a second receiving chamber 60. The base 10 is provided respectively on the lateral arms at the lateral sides of the first and the second receiving chambers 50, 60 with a plurality of guide recesses 70, thereby, different kinds of silicon disks A, A' with different specifications can be inserted therein. The first receiving chamber 50 is provided therein at least with a vertically contacting pin set 80, and the second receiving chamber 60 is provided therein at least with a horizontally contacting pin set 90, in order that when the silicon disks A, A' with different specifications are individually inserted into and fixed to the first or the second receiving chamber 50 (60), they can contact respectively with the vertically contacting pin set 80 or the horizontally contacting pin set 90 to proceed to transmit signals and read/write on the silicon disks A, A'. Hence the module of the present invention can suit all the different specifications of the silicon disks A, A' in the markets. The followings are description of the typical examples of the elements of the present invention:

As shown in FIGS. 2, 4, the base 10 has two mutually parallel lateral arms 11, 12, and a rear side 13, so that the base 10 is opened on the front end thereof to form a horizontally laid "U" shape.

The partitioning plate 20 is in the form of a sheet; it is connected with its two lateral sides to the two lateral arms 11, 12 of the base 10 to divide the base 10 into two areas.

The upper lid 30 is mounted on the upper side of the base 10 to form the first receiving chamber 50 with the partitioning plate 20.

The lower lid 40 is mounted on the lower side of the base 10 to form the second receiving chamber 60 with the partitioning plate 20.

Figure 3:
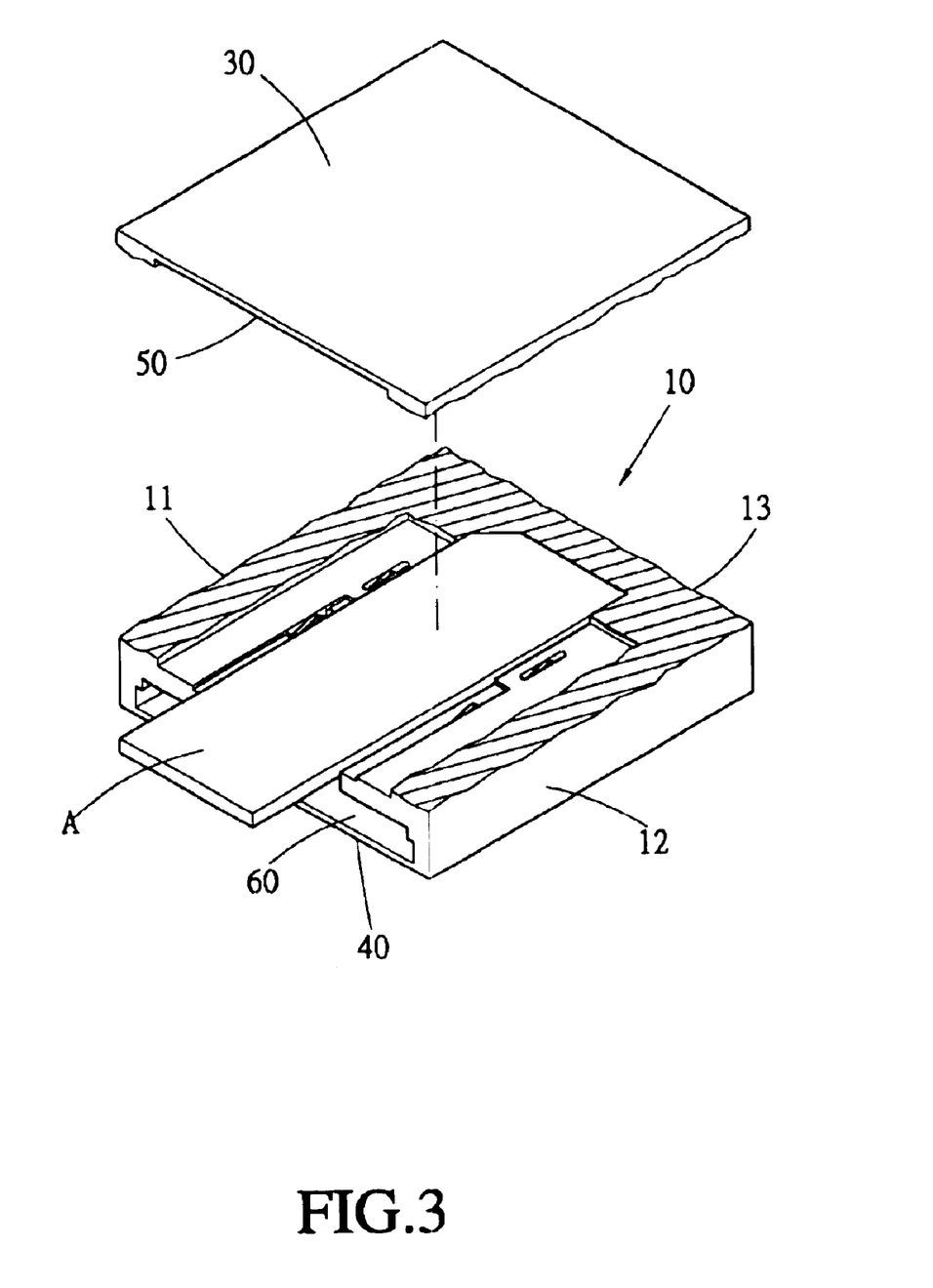
FIG. 3 is a perspective view showing that the first receiving chamber of the present invention receives a silicon disk.

The guide recesses 70 are provided on the base 10 at the left and right sides of the latter respectively, thereby, the first or the second receiving chamber 50, 60 can have at the lateral sides thereof a plurality of guide recesses 70. The silicon disks A, A' sold in the markets presently include at least PC ATA cards, CF cards (CompactFlash cards, e.g. the silicon disks A' as shown in FIG. 5), SM cards (Smart Media cards, e.g. the silicon disks A as shown in FIG. 3), MMC cards (MultiMedia cards), MS cards (Memory Stick cards) and SD card (Secure Digital cards) etc. The guide recesses 70 are provided exactly in pursuance of the specifications of sizes in lengths and widths of these silicon disks.

In the present embodiment, the base 10 forms the first receiving chamber 50 between the partitioning plate 20 and the upper lid 30, so that when the guide recesses 70 are provided, they can be chosen to meet the specification of sizes of the similar SM, MMC, MS and SD cards (as shown in FIG. 2) and provided at the lateral sides of the first receiving chamber 50; and the guide recesses 70 can be provided at the lateral sides of the second receiving chamber 60 to meet the specification of sizes of the PC ATA and CF cards (as shown in FIG. 4).

When in practicing, the guide recesses 70 in the first receiving chamber 50 can also be provided in pursuance of the specifications of sizes of the PC ATA and CF cards; relatively, the guide recesses 70 in the second receiving chamber 60 can also be provided in pursuance of the specifications of sizes of the similar SM, MMC, MS and SD cards.

Figure 6:
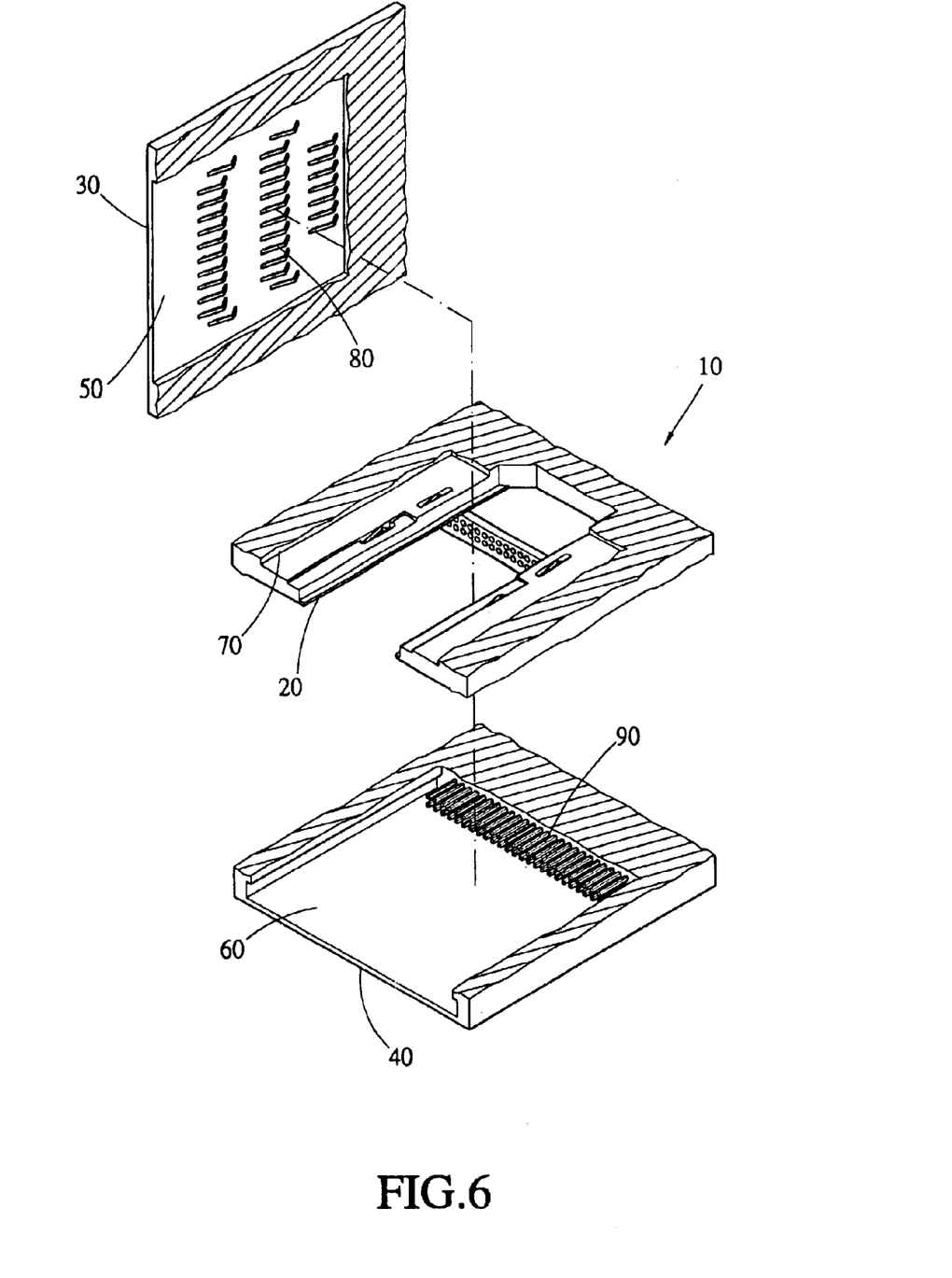
FIG. 6 is a perspective view showing the example wherein there are vertically and the horizontally contacting pin sets.

As shown in FIGS. 2, 3, the vertically contacting pin set 80 can be provided on the bottom of the first receiving chamber 50, i.e., on the top face of the partitioning plate 20 in the first receiving chamber 50; but can also be provided on the inner top of the first receiving chamber 50, i.e., on the bottom face of the upper lid 30 in the first receiving chamber 50 (as shown in FIG. 6).

The direction of insertion of the vertically contacting pin set 80 to a silicon disk A is vertical. In the drawing shown, and in the practical structure that the guide recesses 70 are provided in the first receiving chamber 50 to meet the specifications of sizes of the similar SM, MMC, MS and SD cards, the vertically contacting pin set 80 can be provided in number from one set to three sets (the MMC and SD cards are apparently similar but different in thickness; and as to the number of pins, the former has 9 pins, while the latter has 7 pins; thereby, a vertically contacting pin set with 9 pins can have 7 pins thereof for common use), thereby, the vertically contacting pin set 80 can be contacted with the pins of any of the SM, MMC, MS and SD cards for connecting and signal transmission.

As shown in FIGS. 4 and 5, the horizontally contacting pin set 90 and the silicon disk A' are both inserted horizontally, the horizontally contacting pin set 90 can be provided in number from one set to two sets and can be provided in the rear portion of the second receiving chamber 60 in the lower area of the base 10 for reading/writing on and for transmission of one of the silicon disks A' of the specifications of PC ATA cards, CF cards. When in practicing, the horizontally contacting pin set 90 can be fixed on the rear side 13 of the base 10, or can be directly fixed on the lower lid 40 (as shown in FIG. 6). When one of the silicon disks A' of the specifications of PC ATA cards, CF cards is inserted into the second receiving chamber 60 by guiding of the guide recesses 70, the horizontally contacting pin set 90 can be contacted with the silicon disk A' of the specification of PC ATA cards or CF cards for connecting and signal transmission.

The vertically contacting pin set 80 and the horizontally contacting pin set 90 of the present invention are provided in pursuance of the positions of the guide recesses 70 in the first and second receiving chambers 50, 60, thereby, they are not limited to the positions shown in the drawings. For example, if the guide recesses 70 in the upper first receiving chamber 50 are provided in pursuance of the specifications of sizes of PC ATA cards, CF cards, the vertically contacting pin set 80 is provided in the first receiving chamber 50; relatively, if the guide recesses 70 in the lower second receiving chamber 60 are provided in pursuance of the specifications of sizes of SM, MMC, MS and SD cards, the vertically contacting pin set 80 is provided in the second receiving chamber 60.

Accordingly, in the structures of the embodiments of the multi-specification read/write signal transmission module for silicon disks of the present invention as shown in FIGS. 2–5, when one of the SM, MMC, MS and SD cards among the silicon disks A is inserted into the upper first receiving chamber 50 of the base 10, by virtue that the guide recesses 70 at the lateral sides of the upper first receiving chamber 50 are provided in pursuance of the specifications of sizes of the silicon disks A, in insertion of any of the above mentioned silicon disks A of the specifications of sizes of the SM, MMC, MS and SD cards, the silicon disk A can be guided to be in position by a set of the guide recesses 70, and by contact and connection of the vertically contacting pin set 80 with the silicon disk A (the signal pins of the above mentioned SM, MMC, MS and SD cards are all oriented in the vertical direction), reading/writing on the silicon disk A can be executed. In the same way, when one of the PC ATA and CF cards (one of the silicon disks A') is inserted into the second receiving chamber 60, by guiding can connecting of the guide recesses 70 of the horizontally contacting pin set 90, reading/writing on the silicon disk A' can be executed.

By the different allocations of the vertically contacting pin set 80 and the horizontally contacting pin set 90 in the first and the second receiving chambers 50, 60, when two silicon disks A, A' are inserted respectively into the first and the second receiving chambers 50, 60 respectively of the base 10, the silicon disks A, A' each can be connected with one of the vertically contacting pin set 80 and the horizontally contacting pin set 90 regardless of whether the positions of the signal pins of the silicon disks A, A' are arranged on the upper or lower or the front ends thereof. And reading/writing on the silicon disks A, A' can be executed. In this way, the module of the present invention can suit all the silicon disks with different specifications in the markets.

Besides, the first and the second receiving chambers 50, 60 of the base 10 can be simultaneously inserted respectively therein with one of the silicon disks A, A' with different specifications, so that a consumer owning the two kinds of disks A, A' with different specifications needs no action of repeated drawing out for changing disks when in use, thereby, convenience of use can be increased.

In addition to the above stated embodiments, the guide recesses 70 can also be provided with skid-proof members 71 and error-proof members 72 (referring to FIGS. 2 and 4) to prevent the silicon disks A, A' from sliding or wrong directing during insertion. The skid-proof members 71 depicted in the drawing (FIG. 2) can be a plurality of elastic springs; when a silicon disk A is placed in the first receiving chamber 50 of the base 10, it is pushed upwardly to prevent it from sliding. As shown in FIG. 4, the error-proof members 72 can be provided at the lateral sides of the second receiving chamber 60 on the rear ends of the guide recesses 70; thereby, if a silicon disk A' is wrong in direction or by size when it is placed in, the error-proof members 72 can prevent it from being in position by inserting.

The skid-proof members 71 and error-proof members 72 stated above are mainly for preventing the silicon disks A, A' from sliding or wrong directing during insertion; they are not limited to the structures and the positions shown.

Figure 7:
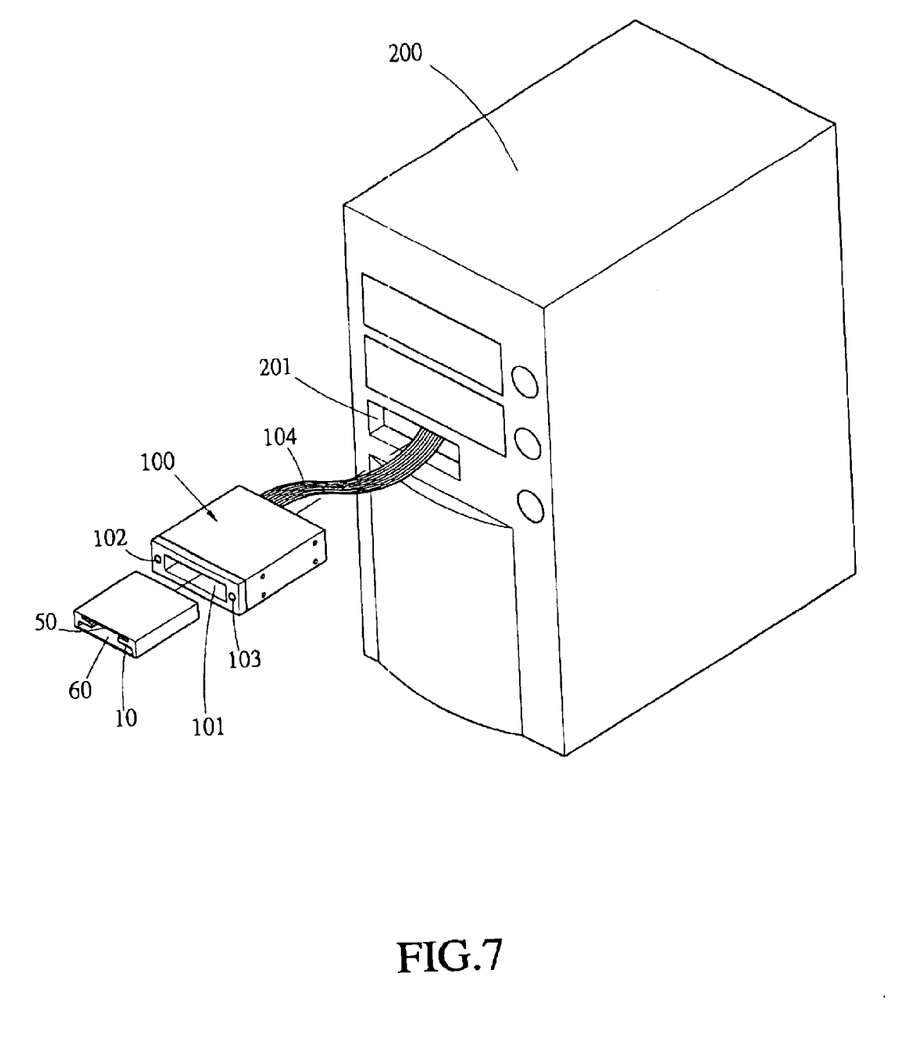
FIG. 7 is a perspective schematic view showing that a built-in cassette is provided on the mainframe of a computer.
Figure 8:
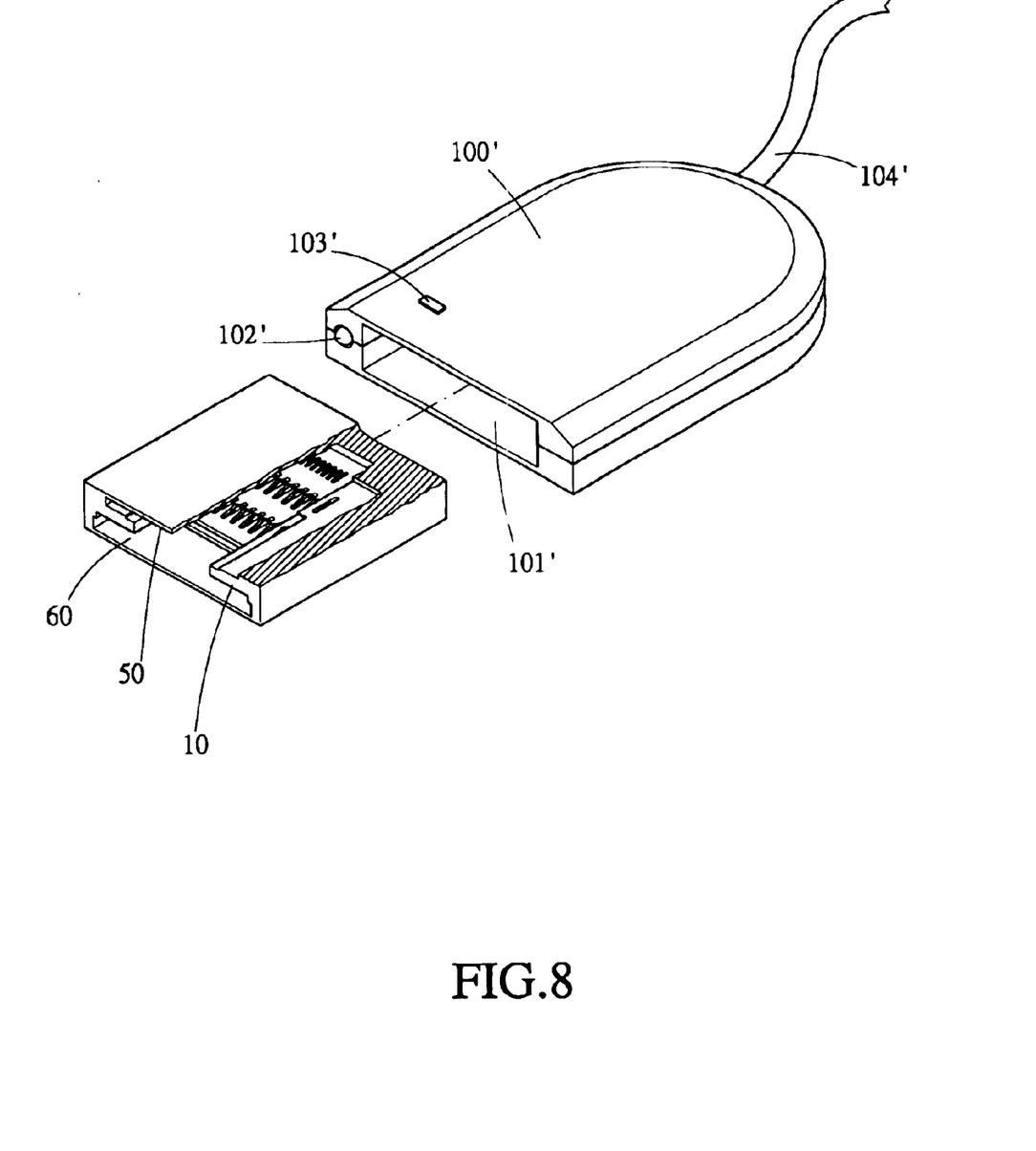
FIG. 8 is a perspective schematic view showing that an externally connected cassette is provided for the module of the present invention.

As shown in FIGS. 7, 8, the multi-specification read/write signal transmission module for silicon disks of the present invention can be mounted in a cassette 100 or 100' when in practicing, the cassette 100 or 100' is provided on the front end thereof with a slot 101 or 101' respectively for inserting and fixing the module of the present invention. When the present invention is mounted in the cassette 100 or 100', the opening of the first or the second receiving chamber 50, 60 of the base 10 faces to the slot 101 or 101' on the front end in a horizontal orientation, thereby, when a user wants to insert a silicon disk A or A' into the module of the present invention, the silicon disk A or A' is inserted through the slot 101 or 101' of the cassette 100 or 100', and is fixed in the first receiving chamber 50 or the second receiving chamber 60, and is positioned by the guide recesses for reading and writing on the silicon disk A or A'.

The cassette 100 shown in FIG. 7 is built in a mainframe system 200 of a computer, or can be provided in a mounting slot 201 of another digital product. The cassette 100 is further provided with a disk rejecting key 102, an indicating lamp 103 and a transmitting interface signal line 104 able to make two-way data transmission with the mainframe system 200 of the computer or the abovementioned another digital product. Thereby, when the silicon disk A or A' is inserted through the slot 101 of the cassette 100 into the module of the present invention, data can be transmitted through the transmitting interface signal line 104, and the state of use can be indicated by the indicating lamp 103. And after using, the silicon disk A or A' can be taken off the module of the present invention by means of the disk rejecting key 102. While the transmitting interface signal line 104 is preferably of the specification of the interface of an IDE/ATAPE system.

The cassette 100' shown in FIG. 8 is externally connected to a mainframe system of a computer. The cassette 100' is further provided, in addition to the slot 101' for inserting and fixing the module of the present invention, with a disk rejecting key 102', an indicating lamp 103' and a transmitting interface signal line 104'. Wherein, the transmitting interface signal line 104' is preferably of one of the specifications of the signal communicating interfaces of USB1.1/2.0 and IEEE1394 generally adopted by the field of computer in the recent years.

The above stated structure of components and their names are only for illustrating the technical content of a preferred embodiment of the present invention, and not for giving any limitation to the scope of the present invention. It will be apparent to those skilled in this art that various equivalent modifications or changes can be made to the elements of the present invention, and shall fall within the scope of the appended claims.

What is claimed is:

1. A multi-specification read/write signal transmission module for silicon disks, comprising:
    a U-shaped base, having a top and a bottom respectively covered with an upper lid and a lower lid, wherein the upper and lower lids are formed with the U-shaped base as an integral body;
    a partitioning plate, mounted to the base between the lower lid and the upper lid in a manner to delimit a first receiving chamber and a second receiving chamber for respectively accommodating silicon disks of different specifications of size therein, the first receiving chamber being between the partitioning plate and the upper lid and the second receiving chamber being between the partitioning plate and the lower lid; and
    a plurality of first contacting pins and second contacting pins, respectively placed in the first receiving chamber and the second receiving chamber for electrically connecting silicon disks inserted in the first receiving chamber and the second receiving chamber, wherein the first contacting pins comprise at least one vertically contacting pin set, and the second contacting pins comprise at least one horizontally contacting pin set.

2. The multi-specification read/write signal transmission module for silicon disks as in claim 1, wherein said base has two parallel lateral arms provided with guide recesses for guiding insertion of the silicon disks.

3. The multi-specification read/write signal transmission for silicon disks as in claim 1, wherein the first contacting pins are from one to three in number; and the second contacting pins &e from one to two in number.

4. The multi-specification read/write signal transmission module for silicon disks as in claim 1, wherein the first contacting pins are placed on a surface of the partitioning plate in the first receiving chamber.

5. The multi-specification read/write signal transmission module for silicon disks as in claim 1, wherein the first contacting pins are on a surface of the upper lid in said first receiving chamber.

6. The multi-specification read/write signal transmission module for silicon disks as in claim 1, wherein the second contacting pins are placed on the lower lid at a rear portion of the second receiving chamber.

7. The multi-specification read/write signal transmission module for silicon disks as in claim 1, wherein the second contacting pins are placed at a rear side of the base in the second receiving chamber.

8. The multi-specification read/write signal transmission module for silicon disks as in claim 1, wherein silicon disks accommodated by the transmission module include at least one of PC ATA cards, CF cards, SM cards, MMC cards, MS cards and SD cards.

9. The multi-specification read/write signal transmission module for silicon disks as in claim 1, wherein two opposite lateral sides of the base respectively have guide recesses for insertion of the silicon disks, the guide recesses being mounted with skid-proof members and error proof members.

10. The multi-specification read/write signal transmission module for silicon disks as in claim 1, being mounted in a cassette through a front slot thereof.

11. The multi-specification read/write signal transmission module for silicon disks as in claim 10, wherein the cassette includes a disk rejecting key, an indicating lamp and a transmitting interface signal line.

12. The multi-specification read/write signal transmission module for silicon disks as in claim 10, wherein said cassette is built in a mainframe system of a computer.

13. The multi-specification read/write signal transmission module for silicon disks as in claim 10, wherein said cassette is externally connected to a mainframe system of a computer.

* * * * *